US007434207B2

(12) United States Patent
Spencer

(10) Patent No.: US 7,434,207 B2
(45) Date of Patent: Oct. 7, 2008

(54) FLOATING DEBUGGER

(75) Inventor: Sam Spencer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 10/188,885

(22) Filed: Jul. 2, 2002

(65) Prior Publication Data

US 2005/0278585 A1    Dec. 15, 2005

(51) Int. Cl.
    *G06F 9/44* (2006.01)
(52) U.S. Cl. .................. 717/125; 717/105; 717/113; 715/764; 715/781; 715/808
(58) Field of Classification Search .............. 717/113, 717/100; 715/764, 788, 798
    See application file for complete search history.

(56) References Cited

U.S. PATENT DOCUMENTS

| 5,819,055 | A | * | 10/1998 | MacLean et al. | ............ | 715/798 |
| 5,883,626 | A | * | 3/1999 | Glaser et al. | ................ | 715/788 |
| 6,151,021 | A | * | 11/2000 | Berquist et al. | ............ | 715/764 |
| 6,317,128 | B1 | * | 11/2001 | Harrison et al. | ............ | 345/629 |
| 6,369,837 | B1 | * | 4/2002 | Schirmer | .................... | 715/764 |

OTHER PUBLICATIONS

Flanagan, "JavaScript: The Definitive Guide, 3rd Edition", Jun. 1998 (24 pages extracted). Online version can be obtained at <http://www.oreilly.com/catalog/jscript3>.*

"ZStep 95: A Reversible, Animated Source Code Stepper", Lieberman et al., 1997 (19 pages). [Online] [Retrieved at] <web.media.mit.edu/~lieber/Lieberary/ZStep/ZStep.html>.*

Adams, E. et al., "A Window-Based Symbolic Debugger for Sun Workstations," *Usenix Association Summer Conf. Proc.*, Jun. 11-14, 1985, Portland, OR, 213-27.

Cargill, T. A., "Debugging C Programs With the Blit," *AT&T Bell Laboratories Technical Journal*, Oct. 1984, 63(8), 54-68.

Dumas, J. et al., "Discovering the Way Programmers Think About New Programming Environments," *Communications of the ACM*, Jun. 1995, 38(6), 45-56.

Goldszmidt, G. S. et al., "High-level Language Debugging for Concurrent Programs," *ACM Transactions on Computer Systems*, Nov. 1990, 8(4), 311-336.

Hall, C. V. et al., "Debugging in a Side Effect Free Programming Environment," *Proceedings of the ACM SIGPLAN 85 Symposium on Language Issues in Programming Environments*, 1985, 60-68.

Hudson, S. E. et al., "Debugging Lenses: A New Class of Transparent Tools for User Interface Debugging," *Proceedings of the 10th Annual ACM Symposium on User Interface Software and Technology*, 1997, Banff, Alberta, Canada, 179-187.

(Continued)

*Primary Examiner*—Tuan Q. Dam
*Assistant Examiner*—Thuy Dao
(74) *Attorney, Agent, or Firm*—Woodcock Washburn LLP

(57) ABSTRACT

Floating or movable windows are provided to display information during debugging, either above the source code, or attached to the source code in the locations that they are relevant to. The floating windows can be semi-transparent in order to allow visibility to both the information in the window and the underlying information such as source code. The windows have different behavior, location, and look, depending on the type of information displayed in window and its relation to the underlying code.

31 Claims, 4 Drawing Sheets

OTHER PUBLICATIONS

Lieberman, H. et al., "Bridging the Gulf Between Code and Behavior in Programming," *Conf. Proc. On Human Factors in Computing Systems*, 1995, Denver, CO, 480-486.

Marantz, J., "Enhanced Visibility and Performance in Functional Verification by Reconstruction," *Proceedings of the 35th Annual Conference on Design Automation*, Jun. 15-19, 1998, San Francisco, CA, 164-169.

Meier, M. S. et al., "Experiences with Building Distributed Debuggers," *Proceedings of the SIGMETRICS Symposium on Parallel and Distributed Tools*, 1996, Philadelphia, PA, 70-79.

Scheifler, R. W. et al., "The X Window System," *ACM Transactions on Graphics*, Apr. 1986, 5(2), 79-109.

Ungar, D. et al., "Debugging and the Experience of Immediacy," *Communications of the ACM*, Apr. 1997, 40(4), 38-43.

* cited by examiner

```
Visual Studio - Documentation Tool                              _ □ X
File  Edit  View  Project  Build  Debug  Tools  Window  Help
Start Page  │MainWindow.vb [Code]│           X │ Solution - DocumentTool   X
MenuFile              ▼ │Popup                ▼│ References
Private Sub MenuFileOpenXML_Click(ByVal sender As S ▲│ bin
    Dim openDialog As OpenFileDialog = New OpenFile  │
                                                     │ Resources
    openDialog.FileName = GetXMLFileName()           │ AssemblyInfo.vb
    openDialog.Filter = XML_FILE_FILTER              │
                                                     │ AssemblyTreeView.vb
    If openDialog.ShowDialog = DialogResult.OK Then  │
        OpenXMLDocumentationFile(openDialog.FileNam  │ DescriptoControls.vb
    End If                                           │
End Sub                                              │ Descriptors.vb
Private Sub MenuFileSave_Click(ByVal sender As Syst  │ ErrorWindow.vb
    SaveXMLDocumentationFile()                       │
End Sub                                              │ FindDialog.vb Private Sub MenuFileSaveAs_Click(ByVal sender As Sy  │ OpenFiles.vb
    SaveWithNewFileName()
End Sub Private Function OpenAssemblyFile(ByVal filename As
    ' Construct the main document and then import t Try
        StatusMessage("Loading Assembly...")
        Update()  'Fixes some redrawing annoyances.

m_Doc = New MainDoc(Me, Reflection.Assembly
        m_Doc.ImportAssembly()
        ErrorWindow.AdjustColumns()       'To make th
            m_AsmFileName = filename
            Return FileResult.Success Catch e As Exception
        MsgBox(GetErrorMessage(ErrorID.ErrorDuringL
        Return FileResult.Failure
    230                           210
    Finally                                    240   ▼
Watch            \     X │ Autos          /    X │ CallStack              X
Name │ Value │ Type    │ Name │ Value │ Type │ Name
                       │
                       │
                       │  Locals              X
                       │  Name │ Value │ Type
                       │
                       │
                       \
                        220
      250                                  Fig. 2
                                           Prior Art
```

Visual Studio - Documentation Tool - Debug Mode

File    Edit    View    Project    Build    Debug    Tools    Window    Help

Start Page | Form1.vb [Code] | X | Solution - DocumentTool | X

Button1 ▼ | Click ▼

```
Sub Button1_Click(ByVal sender As Object, ByVal e A
    'Number of tasks is taken fr    Me = {Form1}
    Dim ntasks As Integer = CInt   sender = {Form1.Bu
    Dim i As Integer               i = 0

320
    'Clear the listview
    ListView1.Items.clear ()
    'Initialize the image list with the two default
    Images.Images.Clear ()

Dim lvi As ListViewItem
    For i=0 to ntasks - 1
        lvi = New ListViewItem("Task " & i)
➤       Dim fb As New Fractal Bitmap (i mod 4)
        QueueItem(Addressof fb.    i = 0
        lvi.Tag = fb               fb = Nothing      — 310
        ListView1.Items.Add(lvi)   lvi = {ListViewItem}
    Next
End Sub

340
```

Locals (320)
Autos (310)

Watch:
i = 0
ntasks = 50
330

References
bin
Resources
AssemblyInfo.vb
AssemblyTreeView.vb
DescriptoControls.vb
Descriptors.vb
ErrorWindow.vb
FindDialog.vb
OpenFiles.vb Build Errors | X | Command Window | X

| File | Line | Error |
|------|------|-------|
|      |      |       |

```
Visual Studio - Documentation Tool - Debug Mode                    _ □ X
File   Edit   View   Project   Build   Debug   Tools   Window   Help
Start Page  Form1.vb [Code]                              X  Solution - DocumentTool   X
Button1                    ▼  Click                      ▼
                                                            References
Sub Button1_Click(ByVal sender As Object, ByVal e A  ▲
    'Number of tasks is taken fr │ Me = {Form1}    ▶       bin
    Dim ntasks As Integer = CInt │ sender = {Form1.Bu▶     Resources
    Dim i As Integer             │ i = 0                   AssemblyInfo.vb
                                       320                 AssemblyTreeView.vb
    'Clear the listview                                    DescriptoControls.vb
    ListView1.Items.clear ()                               Descriptors.vb
    'Initialize the image list with the two default        ErrorWindow.vb
    Images.Images.Clear ()                                 FindDialog.vb
                                                           OpenFiles.vb
    Dim lvi As ListViewItem
    For i=0 to ntasks - 1
        lvi = New ListViewItem("Task " & i)
➡      Dim fb As New FractalBitmap(i mod 8)
        QueueItem(Addressof fb.  │ i = 0
        lvi.Tag = fb             │ fb = Nothing
        ListView1.Items.Add(lvi) │ lvi
    Next                         │ bounds = [x1=100, y1   Custom │ System
End Sub                          │ Checked = False         ActiveBorder    ■
            340                  │ Index = .1              ActiveCaption   ▭
                           310              312            AppWorkspace    ▭
                                                           Desktop         ▭
                                                           Gray Text       ▬
                                                           HotTrack        ▬
                                                                    314
                                                      ▼
Build Errors              X │ Command Window                            X
File  │ Line │ Error        │
```

Fig. 4

FLOATING DEBUGGER

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2002, Microsoft Corporation, All Rights Reserved.

FIELD OF THE INVENTION

This invention relates in general to the field of software. More particularly, this invention relates to debuggers.

BACKGROUND OF THE INVENTION

To manage the complexity of long computer programs, computer programmers often adopt object-oriented programming techniques. With these techniques, a computer program is organized as multiple smaller modules called objects. An object is a unit of code comprising both routines and data and is thought of as a discrete entity. These objects perform specified functions and interact with other objects in pre-defined ways. Objects communicate with each other through interfaces. Each object may have multiple interfaces. An interface exposes and defines access to the object's public routines and data. Put another way, an interface can be considered as the definition of an expected behavior and expected responsibilities. One of the advantages to interfaces is that a client object can continue to access the methods of a server object that are exposed through the interface, regardless of whether the underlying code in the object is updated or changed for another reason.

One of the primary benefits of object-oriented programming is that the objects can be easily and affordably adapted to meet new needs by combining them in a modular fashion. The structural foundation for an object-oriented language is the object model. The Component Object Model (COM) produced by Microsoft Corporation of Redmond, Wash., is an example of an object model.

A debugger is a program that is used to monitor execution and find errors in other programs. A user such as a developer uses a debugger to stop a program at any point and to examine and change the values of variables.

A screenshot of a conventional debugger is shown in FIG. 2. Typically, debuggers show state information about the variables and objects in a program in windows, such as an autos window 210, a locals window 220, and a watch window 230. These windows are docked to the bottom of the development environment (i.e., the display screen 250), and are not movable. Because of this, a user must shift his gaze back and forth between the code window 240 and the state information windows 210, 220, 230 in order to correlate where the program is executing with information about the code being executed.

Moreover, in a conventional debugger, a user has to scroll within a window (i.e., drill down through a tree via scrolling). For object-oriented languages, when the user wants to look at an object in one of the debugger windows, he needs to expand the object to see the sub-members. This expansion of the object is typically done in the manner of an expandable tree view. When the list of object members is larger than can fit in the window, the user must scroll the window to see all the relevant members.

Conventional debuggers supply a watch window (such as watch window 230) where expressions can be typed by a user and evaluated. The watch window is used for viewing expressions entered by a user, which may be a variable name, or a complex expression involving multiple operations and function calls. A problem is that the conventional debugger supplies only one window or a limited number. As a watch is only valid when arguments within its expression are in scope, during a debugging session a user may need a large number of watches, of which only a small number are valid at a point in the source code.

In view of the foregoing, there is a need for systems and methods that overcome the limitations and drawbacks of the prior art.

SUMMARY OF THE INVENTION

The present invention overcomes these problems by providing floating or movable windows in a debugger. The debugging windows can be located either at a predetermined position within the source code window or at a position determined by the user. The floating windows can be semi-transparent in order to allow visibility to both the information in the window and the underlying information such as source code. The locality of the debugging information is thus closely tied to the locality in source code.

According to aspects of the invention, each debugging window comprises an autos window, a locals window, or a watch window, and the debugging window is locked on the display after it has been moved.

According to further aspects of the invention, the debugging window comprises a pop-up window, and provides an indication that a related pop-up window is available. The related pop-up window preferably comprises pull-down expansion.

According to another aspect of the invention, the debugging window is bounce-contained within the code window.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2 is a screenshot of a conventional debugger;

FIG. 3 is an exemplary screenshot showing floating windows in accordance with the present invention; and FIG. 4 is another exemplary screenshot showing floating windows and pop-up windows in accordance with the present invention.

DETAILED DESCRIPTION OF PREFERRED EMBODIMENTS

Overview

Figure 1:
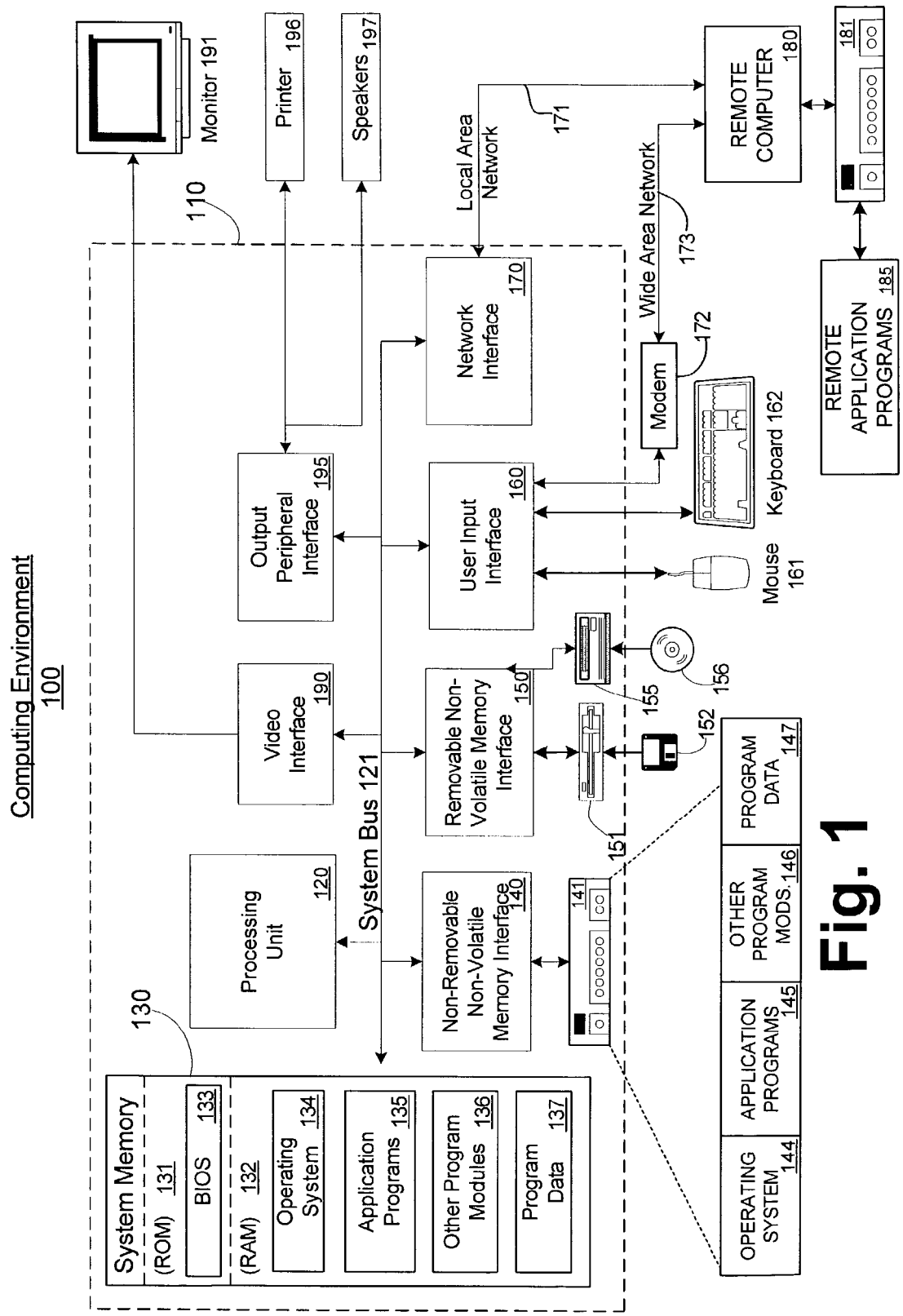
FIG. 1 is a block diagram showing an exemplary computing environment in which aspects of the invention may be implemented.

The present invention is directed to systems and methods that provide floating or movable windows in a debugger. The present invention can be implemented in a variety of languages and tools such as MICROSOFT VISUAL BASIC, MICROSOFT VISUAL C++, MICROSOFT VISUAL FOX-PRO, all produced by Microsoft Corporation of Redmond, Wash. Moreover, the invention can be used with other languages, tool, and object models (e.g., objects designed according to a specification such as the Common Object Request Broker Architecture (CORBA) which provides a standard messaging interface between distributed objects or according to Sun Microsystems' Java specifications).

The present invention improves a user's debugging experience for source code. Conventionally, debuggers show state information about a program's variables and objects in windows that are docked to the bottom of the development environment (i.e., the display screen). A user must shift his gaze back and forth between the code window and the state information windows in order to correlate where the program is executing with information about the code being executed. The present invention shows the expressions and information in floating or movable windows, either above the source code, or attached to the source code in the locations that they are relevant to. The floating windows can be semi-transparent in order to allow visibility to both the information in the window and the underlying information such as source code. The windows have different behavior, location, and look, depending on the type of information displayed in window and its relation to the underlying code.

The present invention provides a user with easier access to the data about the variables in his program, close to where the variables are used. The debugger interface also provides the ability for watches of specific expressions to be pinned to the source code so that the watch is visible along with the source code. The locality of the debugging information is thus closely tied to the locality in source code.

Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that the debugging of the present invention may be performed by, supported in, or accessed via all of .NET's languages and services, and in other distributed computing frameworks as well.

Exemplary Embodiments

FIG. 3 is an exemplary screenshot showing floating debugging windows in accordance with the present invention. A code window 340 is shown on the display screen 350, which also shows a command window and a build errors window. Instead of being docked at the bottom of the display screen, the autos window 310, the locals window 320, and the watch window 330 are selectable and draggable, i.e., "floating". In this manner, the debugging windows 310, 320, 330 are movable and can be located either at a determined position within the code window 340 based on the code, for example, or at a position determined by the user.

A user can select a debugging window to move by clicking on the window and dragging it to the desired location on the display. After the window is released by the user, it is locked into place. It is contemplated that the user can re-select a debugging window and move it to another location on the display at a later time. Thus, once a window is dragged and moved, it becomes fixed, but optionally can be moved at a later time by the user or the underlying debugger application.

In FIG. 3, the windows 310, 320, 330 are shown as being disposed within the code window 340. Thus, with the present invention, windows containing information that a user may want to monitor can be shown close to the code in the debugger, or anywhere on the display screen that the user chooses. Moreover, because the invention allows a user to remove the docked windows, more useable display area on the display screen 350 is achieved.

According to an embodiment, each of the windows 310, 320, 330 is semi-transparent, so that information in the underlying portion of the code window 340 is visible to the user, in addition to the information being displayed in the windows 310, 320, 330.

The autos window 310 is a window that shows the variables and expressions that are used in the statement at the instruction pointer, and desirably the lines above and below that statement. It therefore preferably shows the most relevant variables for debugging at that point in the code. In other words, the autos window 310 shows variables that are most applied to what is being used. The autos window preferably floats near the current statement. As such, the autos window 310 is preferably positioned next to the statement at the instruction pointer.

The locals window 320 shows the local variables for the routine that is being run. In other words, the locals window 320 shows the local variables that are in scope for the instruction pointer. Because the scope of the variables is governed by the procedure they reside in, the locals window 320 is preferably shown in a semi-transparent window over the code window 340, next to the beginning of the function declaration, or scoping construct for the variables. According to an embodiment, if the scoping construct is not visible, because it is scrolled off screen, then the pane of the locals window 320 bounces at the top or bottom of the code window 340, depending on the direction the source is scrolled. Thus, the locals window 320 will bounce if taken off screen. Preferably, the locals window 320 is implemented as a pop-up window.

The watch window 330 is also floating and is used for viewing user defined expressions, such as a global variable. The watch window 330 can be created and pinned to the document, so when the document moves, the watch window moves with it. Most debuggers supply a watch window where expressions can be typed and evaluated. A problem is that the conventional debugger supplies only one window or a limited number. As a watch is only valid when arguments within its expression are in scope, during a debugging session a user may need a number of watches, of which only a small number are valid at a point in the source code. According to an embodiment, the present invention solves the problem by enabling the user to create watch panes that can be pinned to the source code. When the source code is scrolled, the watch pane scrolls with it. Thus, the developer can have many watches, all of which are maintained along with the source that they apply to.

FIG. 4 is another exemplary screenshot showing the floating windows 310, 320 in accordance with the present invention, along with pop-ups 312, 314 that use pull-down expansion, which is much easier than scrolling. FIG. 4 contains elements similar to those described above with respect to FIG. 3. These elements are labeled identically and their description is omitted for brevity. It is noted that a watch window 330 is not shown in FIG. 4, but it is contemplated that a watch window 330 could be present.

For object-oriented languages, when a user such as a developer wants to look at an object in one of the debugger windows, he needs to expand the object to see the sub-members. That is conventionally done in the manner of an expandable tree view. According to an embodiment of the invention, expanding an object is performed with the use of a pop-up window, such as a pop-up window 312. Another pop-up window, such as pop-up window 314, may be accessible from the first pop-up window 312. If a window or an item is expandable, an indication is provided, and it can be popped up. If an item in a window is not expandable, the user preferably can select the item (e.g., by clicking on the item) and the item desirably becomes a text value that can be edited.

If the user wishes to continue to view the members of the object, he can drag off the pop-up and turn it into a persistent window. The window can then be pinned to the source code to scroll, if desired.

Preferably, the pop-up windows contain graphical visuals, rather than just names and codes (texture). The graphical visuals desirably comprise a visual view that replaces a textual representation. Pop-up window 314 in FIG. 4 shows such an exemplary view for the color type so that is is shown as a color picker. The replacement view can be registered against object types using the Custom Attribute mechanism for assembly metadata provided by the .NET runtime, for example. Preferably, each pop-up window is semi-transparent so the user can view the underlying information residing on the display.

As mentioned above, while exemplary embodiments of the present invention have been described in connection with various computing devices and network architectures, the underlying concepts may be applied to any computing device or system in which it is desirable to provide debugging capability. Thus, the interface for debugging in accordance with the present invention may be applied to a variety of applications and devices. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the debugging interface aspects of the present invention, e.g., through the use of a data processing API or the like, are preferably implemented in a high level procedural or object-oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the debugging capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. In a computer system having a graphical user interface including a display and a user interface selection device, a method of providing a debugging window on the display, comprising the steps of:
    (a) generating a command window and a semi-transparent debugging window associated with a code window to allow content of each of the debugging window, pop-up windows expanded from the debugging window, the command window, and the code window to be displayed, the debugging window comprising a plurality of watch windows, each of the plurality of watch windows being associated with at least one expression displayed on the code window, wherein the plurality of watch windows is not limited in quantity;
    (b) displaying the debugging window on the display;
    (c) selecting the debugging window on the display;
    (d) receiving a movement signal indicative of the user interface selection device moving, and, in response to the movement signal, moving the debugging window on the display, and bouncing the debugging window at a side of the display if the movement signal is indicative of moving the debugging window off the display;
    (e) pinning the debugging window, and the expanded pop-up windows, associated with the code window to a portion of code displayed on the code window; and
    (f) pinning each of the plurality of watch windows to its associated at least one expression displayed on the code window.

2. The method of claim 1, further comprising locking the debugging window on the display after moving the debugging window on the display.

3. The method of claim 1, wherein moving the debugging window on the display comprises moving the debugging window to a portion of the display that comprises the code window, the debugging window overlying a portion of the code window.

4. The method of claim 1, wherein generating the debugging window further comprises generating at least one autos window.

5. The method of claim 1, wherein generating the debugging window comprises generating a pop-up debugging window.

6. The method of claim 1, further comprising providing an indication in the debugging window that a related pop-up window is available.

7. The method of claim 6, further comprising receiving a related window selection signal indicative of the user interface selection device selecting the related pop-up window, and, in response to the selection signal, generating the related pop-up window on the display.

8. The method of claim 7, wherein selecting the related pop-up window comprises pull-down expansion.

9. A debugger user interface in a computer system including a display and a user interface selection device, comprising:
    a code window;
    a command window; and
    a movable, semi-transparent debugging window overlying a portion of the code window, the debugging window comprising a plurality of watch windows, each of the plurality of watch windows being associated with at least one expression displayed on the code window, wherein the plurality of watch windows is not limited in quantity, wherein the debugging window is bounce-contained within the code window, wherein content of each of the debugging window, pop-up windows expanded from the debugging window, the command window, and the code window is displayed, wherein the debugging window, and the expanded pop-up windows, associated with the code window is pinned to a portion of code displayed on the code window, and wherein each of the plurality of watch windows is pinned to its associated at least one expression displayed on the code window.

10. The debugger user interface of claim 9, wherein the movable debugging window is locked on the debugging display after being moved.

11. The debugger user interface of claim 9, wherein the debugging window further comprises at least one of an autos window and a locals window.

12. The debugger user interface of claim 9, wherein the debugging window comprises a pop-up debugging window.

13. The debugger user interface of claim 9, wherein the debugging window comprises an indication that a related pop-up window is available.

14. The debugger user interface of claim 13, wherein the related pop-up window is accessible via pull-down expansion.

15. The debugger user interface of claim 14, wherein the related pop-up window is scrollable.

16. The debugger user interface of claim 9, further comprising a second movable debugging window overlying a portion of the code window, the movable debugging window comprising one of an autos window, a locals window, and a watch window, and the second movable debugging window comprising another of the autos window, the locals window, and the watch window.

17. A computer-readable storage medium having computer-executable instructions for performing steps comprising:

(a) generating a command window and a semi-transparent debugging window associated with a code window to allow content of each of the debugging window, pop-up windows expanded from the debugging window, the command window, and the code window to be displayed, the debugging window comprising a plurality of watch windows, each of the plurality of watch windows being associated with at least one expression displayed on the code window, wherein the plurality of watch windows is not limited in quantity;

(b) displaying the debugging window on the display;

(c) selecting the debugging window on the display;

(d) receiving a movement signal indicative of the user interface selection device moving, and, in response to the movement signal, moving the debugging window on the display, and bouncing the debugging window at a side of the display if the movement signal is indicative of moving the debugging window off the display;

(e) pinning the debugging window, and the expanded pop-up windows, associated with the code window to a portion of code displayed on the code window; and (f) pinning each of the plurality of watch windows to its associated at least one expression displayed on the code window.

18. The computer-readable medium of claim 17, having further computer-executable instructions for locking the debugging window on the display after moving the debugging window on the display.

19. The computer-readable medium of claim 17, wherein moving the debugging window on the display comprises moving the debugging window to a portion of the display that comprises the code window, the debugging window overlying a portion of the code window.

20. The computer-readable medium of claim 17, wherein generating the debugging window further comprises generating at least one of an autos window and a locals window.

21. The computer-readable medium of claim 17, wherein generating the debugging window comprises generating a pop-up debugging window.

22. The computer-readable medium of claim 17, having further computer-executable instructions for providing an indication in the debugging window that a related pop-up window is available.

23. The computer-readable medium of claim 22, having further computer-executable instructions for receiving a related window selection signal indicative of the user interface selection device selecting the related pop-up window, and, in response to the selection signal, generating the related pop-up window on the display.

24. The computer-readable medium of claim 23, wherein selecting the related pop-up window comprises pull-down expansion.

25. A computer-readable storage medium having instructions for providing a user interface component that comprises a command window and a code window; and a movable, semi-transparent debugging window overlying a portion of the code window, the debugging window comprising a plurality of watch windows, each of the plurality of watch windows being associated with at least one expression displayed on the code window, wherein the plurality of watch windows is not limited in quantity, wherein the debugging window is bounce-contained within the code window, wherein content of each of the debugging window, pop-up windows expanded from the debugging window, the command window, and the code window is displayed, wherein the debugging window, and the expanded pop-up windows, associated with the code window is pinned to a portion of code displayed on the code window, and wherein each of the plurality of watch windows is pinned to its associated at least one expression displayed on the code window.

26. The computer-readable medium of claim 25, wherein the movable debugging window is locked on the debugging display after being moved.

27. The computer-readable medium of claim 25, wherein the debugging window further comprises at least one of an autos window and a locals window.

28. The computer-readable medium of claim 25, wherein the debugging window comprises a pop-up debugging window.

29. The computer-readable medium of claim 25, wherein the debugging window comprises an indication that a related pop-up window is available.

30. The computer-readable medium of claim 29, wherein the related pop-up window is accessible via pull-down expansion.

31. The computer-readable medium of claim 30, wherein the related pop-up window is scrollable.

* * * * *